US010418611B2

(12) United States Patent
Waki et al.

(10) Patent No.: US 10,418,611 B2
(45) Date of Patent: Sep. 17, 2019

(54) ELECTROCHEMICAL DEVICE (71) Applicant: GS YUASA INTERNATIONAL LTD., Kyoto-shi (JP)

(72) Inventors: Shogo Waki, Kyoto (JP); Hideki Masuda, Kyoto (JP); Masahiro Uchida, Kyoto (JP); Syun Ito, Kyoto (JP); Seiichi Irie, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 15/797,669

(22) Filed: Oct. 30, 2017

(65) Prior Publication Data

US 2018/0069226 A1 Mar. 8, 2018

Related U.S. Application Data (63) Continuation of application No. 13/644,375, filed on Oct. 4, 2012, now Pat. No. 9,929,392.

(30) Foreign Application Priority Data

Oct. 4, 2011 (JP) .................................. 2011-220011
Sep. 21, 2012 (JP) .................................. 2012-208022

(51) Int. Cl.
*H01M 2/26* (2006.01)
*H01M 2/10* (2006.01)

(52) U.S. Cl.
CPC .............. *H01M 2/26* (2013.01); *H01M 2/10* (2013.01)

(58) Field of Classification Search
CPC .................................. H01M 2/26; H01M 2/10
See application file for complete search history.

(56) References Cited

U.S. PATENT DOCUMENTS 6,156,452 A 12/2000 Kozuki et al.
6,432,578 B1 8/2002 Sugita et al.
(Continued)

FOREIGN PATENT DOCUMENTS

JP H11-195434 A 7/1999
JP 2000-058035 A 2/2000
(Continued)

OTHER PUBLICATIONS

Japanese Office Action dated Jul. 21, 2016 with a partial English translation thereof.
(Continued)

*Primary Examiner* — Jimmy Vo
(74) *Attorney, Agent, or Firm* — McGinn IP Law Group, PLLC (57) ABSTRACT

An electrochemical device includes a power generating element including a main portion and a terminal portion, the main portion including an electrode prepared by forming an active material layer on a metal foil surface, the terminal portion being provided on a side of the main portion, the terminal portion including layers of metal foils, an outer package including a container and a lid, the container including a side wall and a bottom wall and housing the power generating element, the lid being formed with a terminal, a current collector including a leg portion to which the layers of metal foils are attached, and a movement restricting member being arranged between the terminal portion of the power generating element and an inner surface of the side wall opposite the terminal portion. The movement restricting member includes a holding portion.

21 Claims, 10 Drawing Sheets

(56) References Cited

U.S. PATENT DOCUMENTS

| | | |
|---|---|---|
| 7,666,547 B2 | 2/2010 | Urano et al. |
| 7,790,313 B2 | 9/2010 | Lee |
| 8,808,903 B2 | 8/2014 | Shinoda et al. |
| 2003/0129479 A1 | 7/2003 | Munenaga |
| 2006/0024578 A1 | 2/2006 | Lee |
| 2006/0073382 A1 | 4/2006 | Urano et al. |
| 2009/0011329 A1 | 1/2009 | Yoon |
| 2010/0143787 A1 | 6/2010 | Jung et al. |
| 2011/0052976 A1 | 3/2011 | Ishii et al. |
| 2011/0200865 A1 | 8/2011 | Byun et al. |
| 2011/0311851 A1 | 12/2011 | Shinoda et al. |
| 2014/0322578 A1 | 10/2014 | Shinoda et al. |

FOREIGN PATENT DOCUMENTS

| | | |
|---|---|---|
| JP | 2000-200595 A | 7/2000 |
| JP | 2006-040901 A | 2/2006 |
| JP | 2006-100097 A | 4/2006 |
| JP | 2008-262788 A | 10/2008 |
| JP | 2010-509711 A | 3/2010 |
| JP | 2010-231946 A | 10/2010 |
| JP | 2010-238469 A | 10/2010 |
| JP | 2011-8944 A | 1/2011 |
| JP | 2011-049066 A | 3/2011 |
| JP | 2011-159389 A | 8/2011 |
| JP | 2011-171286 A | 9/2011 |
| JP | 2012-227110 A | 11/2012 |

OTHER PUBLICATIONS

ISBN-13:978-4769311966 (ISBN-10:4769311966) with a partial English translation of the relevant parts of the Reasons for Refusal.
Office Action in U.S. Appl. No. 13/644,375 dated May 19, 2015.
Office Action in U.S. Appl. No. 13/644,375 dated Nov. 18, 2015.
Office Action in U.S. Appl. No. 13/644,375 dated Sep. 27, 2016.
Office Action in U.S. Appl. No. 13/644,375 dated Apr. 11, 2017.
Notice of Allowance in U.S. Appl. No. 13/644,375 dated Aug. 8, 2017.

ELECTROCHEMICAL DEVICE

The present application is a Continuation Application of U.S. patent application Ser. No. 13/644,375, filed on Oct. 4, 2012, which is based on and claims priority from Japanese Patent Application No. 2011-220011, filed on Oct. 4, 2011, and Japanese Patent Application No. 2012-208022, filed on Sep. 21, 2012, the entire contents of which are incorporated herein by reference.

TECHNICAL FIELD

The invention disclosed in this specification relates to an electrochemical device.

BACKGROUND

A known electrochemical device, such as a battery and an electric double layer capacitor, includes an outer package and a power generating element housed in the outer package. The power generating element includes electrodes with active material layers formed on metal foil surfaces of the respective electrodes. In general, each electrode has a portion on which the active material layer is not formed and a current collector is connected to an electrode terminal provided for input and output of power.

In the known electrochemical device, a synthetic resin sheet is disposed between the power generating element and the outer package for vibration and impact protection purposes. However, such a sheet may not provide sufficient protection for the power generating element that may move inside the outer package when strong vibrations or a high impact is applied to the power generating element. As a result, the current collector may deform or stick into the power generating element. If that happens, an internal short-circuit may occur. To improve a safety level of the electrochemical device, vibration and impact resistance needs to be increased. Especially, when the power generating element is used for a vehicular battery, the power generating element requires considerably high resistance for vibrations that occur while the vehicle is running and for an impact that may be applied in a collision of the vehicle. Therefore, the improvement of the vibration and impact resistance is mandatory.

SUMMARY

An electrochemical device includes a power generating element, an outer package, a current collector, and a movement restricting member. The power generating element includes a main portion and a terminal portion. The main portion includes an electrode prepared by forming an active material layer on a metal foil surface of the electrode. The terminal portion is provided on a side of the main portion. The outer package houses the power generating element. The current collector is connected to the terminal portion of the power generating element. The movement restricting member includes a holding portion arranged between the side of the main portion of the power generating element and an inner surface of the outer package opposite the side of the main portion.

With the above configuration, the current collector is less likely to deform or stick into the power generating element even when the electrochemical device is subjected to strong vibrations or a high impact. Namely, high resistance to vibrations and an impact can be provided.

According to technologies described herein, an electrochemical device having high resistance to vibrations and an impact can be provided.

DETAILED DESCRIPTION

<First Embodiment>

A first embodiment will be described with reference to FIGS. 1 to 6. A large-size lithium ion battery, which is an electrochemical device, is used in this embodiment. The lithium ion battery is one type of non-aqueous electrolyte secondary batteries used in electric vehicles and hybrid vehicles. The lithium ion battery is hereinafter referred to as a cell B1.

The cell B1 is a square battery including a power generating element 10 housed in an outer package 20. The power generating element 10 has a flattened shape and the outer package 20 has a box-like shape. The outer package 20 is filled with an electrolyte. In the drawings, orientations of components of the cell B1 are indicated by arrows U, F, and R pointing to the upper side, the front side, and the right side of the cell B1.

The power generating element 10 includes a positive terminal portion 10A, a negative terminal portion 10B, and a main portion 10C. The positive terminal portion 10A and the negative terminal portion 10B are located on the left side and the right side of the main portion 10C, respectively. In the main portion 10C, a core 11 is provided. A positive electrode, a negative electrode, and a separator are layered such that the separator is between the positive electrode and the negative electrode. The positive electrode, the negative electrode, and the separator are wound around the core 11.

The positive electrode includes a strip-shaped aluminum foil with a cathode active material layer formed on a surface of the aluminum foil. At a left edge of the positive electrode, or in the positive terminal portion 10A, an aluminum foil without a cathode active material layer, that is, a bare aluminum foil is provided. The bare aluminum foil is referred to as a positive current collector foil 12A.

The positive current collector foil 12A is wound in an oval form with a long axis along the vertical direction so as to form layers. The layers of the positive current collector foil 12A in a straight section of the oval shape on the front side are pinched together. The layers of the positive current collector foil 12A in a straight section of the oval shape on the rear side are pinched together. The pinched layers of the positive current collector foil 12A in the straight sections are configured as attachment portions 13 to which positive current collector 24A is attached (see FIG. 4). The positive current collector 24A will be explained later.

Figure 6:
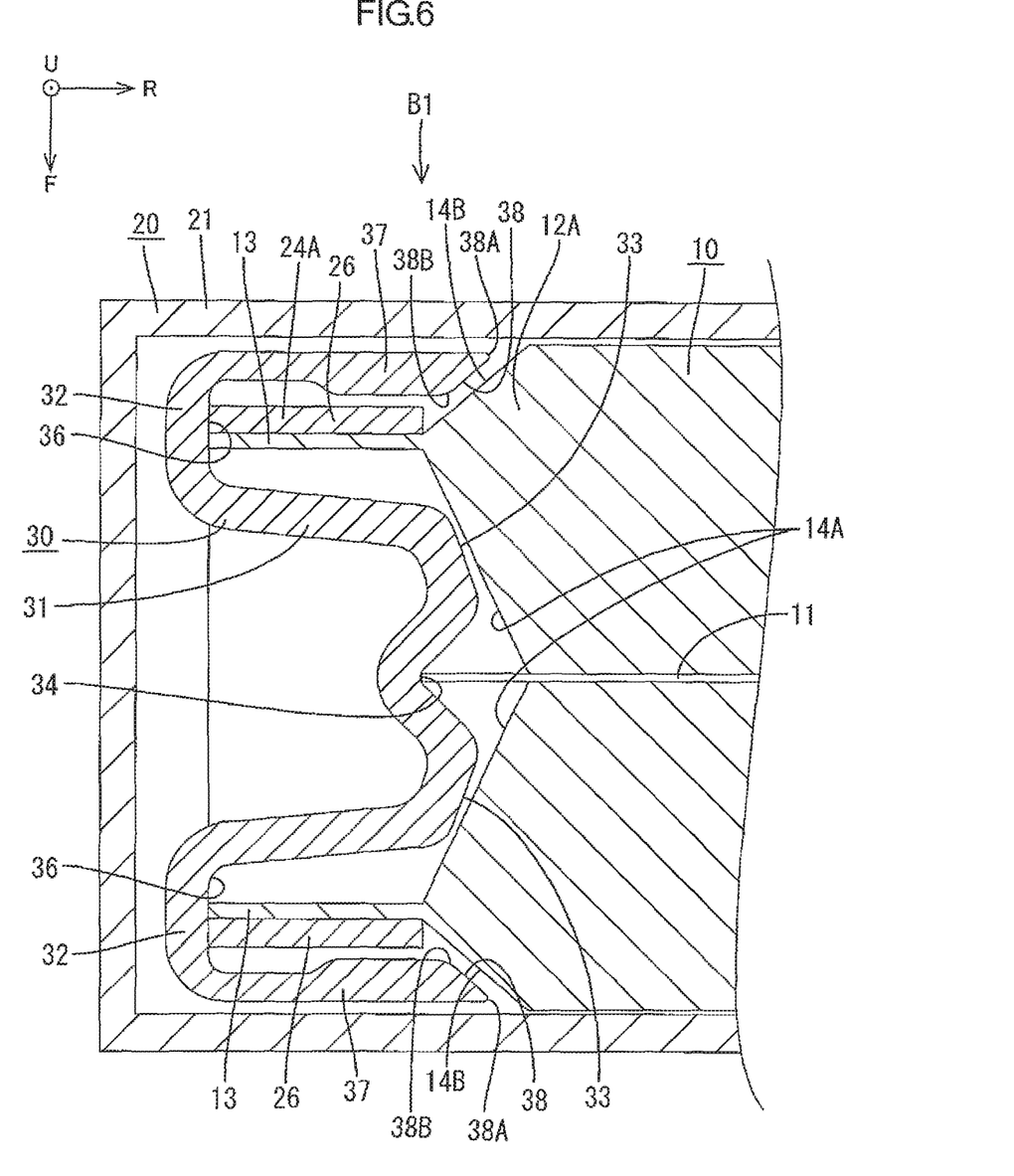
FIG. 6 is a magnified partial cross-sectional view illustrating the power generating element with the spacers attached thereto housed in the outer package.

Because the layers of the positive current collector foil 12A are pinched together, sloped surfaces are formed between each attachment portion 13 and the core 11, and between each attachment portion 13 and the corresponding outer surface of the main portion 10C, as illustrated in FIG. 6. Specifically, inner sloped surfaces 14A located inner than the attachment portions 13 and outer sloped surfaces 14B located outer than the attachment portions 13 are formed. Each inner sloped surface 14A declines from the attachment portion 13 to the core 11. Each outer sloped surface 14B declines from the attachment portion 13 to the outer surface of the main portion 10C. The inner sloped surface 14A is more gentle than the outer sloped surface 14B.

The negative electrode includes a strip-shaped copper foil with an anode active material layer formed on a surface of the copper foil. At a right edge of the negative electrode, or in the negative terminal portion 10B, a copper foil without an anode active material layer, that is, a bare copper foil is provided. The bare copper foil is referred to as a negative current collector foil 12B.

The negative current collector foil is wound in an oval form with a long axis along the vertical direction so as to form layers. The layers of the negative current collector foil 12B in a straight section of the oval shape on the front side are pinched together. The layers of the negative current collector foil 12B in a straight section of the oval shape on the rear side are pinched together. The pinched layers of the negative current collector foil 12B in the straight sections are configured as attachment portions 13 to which negative current collector 24B is attached. The negative current collector 24B will be explained later.

Sloped surfaces are formed in the negative terminal portion 10B in the same manner as in the positive terminal portion 10A.

The positive electrode and the negative electrode are layered and wound such that: the positive current collector foils 12A and the negative current collector foils 12B are arranged on opposite sides; the positive current collector foils 12A are located outer than the separator and the negative electrode; and the negative current collector foils 12B are located outer than the separator and the positive electrode.

The power generating element 10 includes a positive terminal portion 10A, a negative terminal portion 10B, and a main portion 10C. The positive terminal portion 10A and the negative terminal portion 10B are located on the left and the right of the main portion 10C, respectively. The positive current collector foils 12A project from the left side of the main portion 10C, that is, the positive current collector foils 12A are located in the positive terminal portion 10A. The negative current collector foils 12B project from the right side of the main portion 10C, that is, the negative current collector foils 12B are located in the negative terminal portion 10B.

Figure 1:
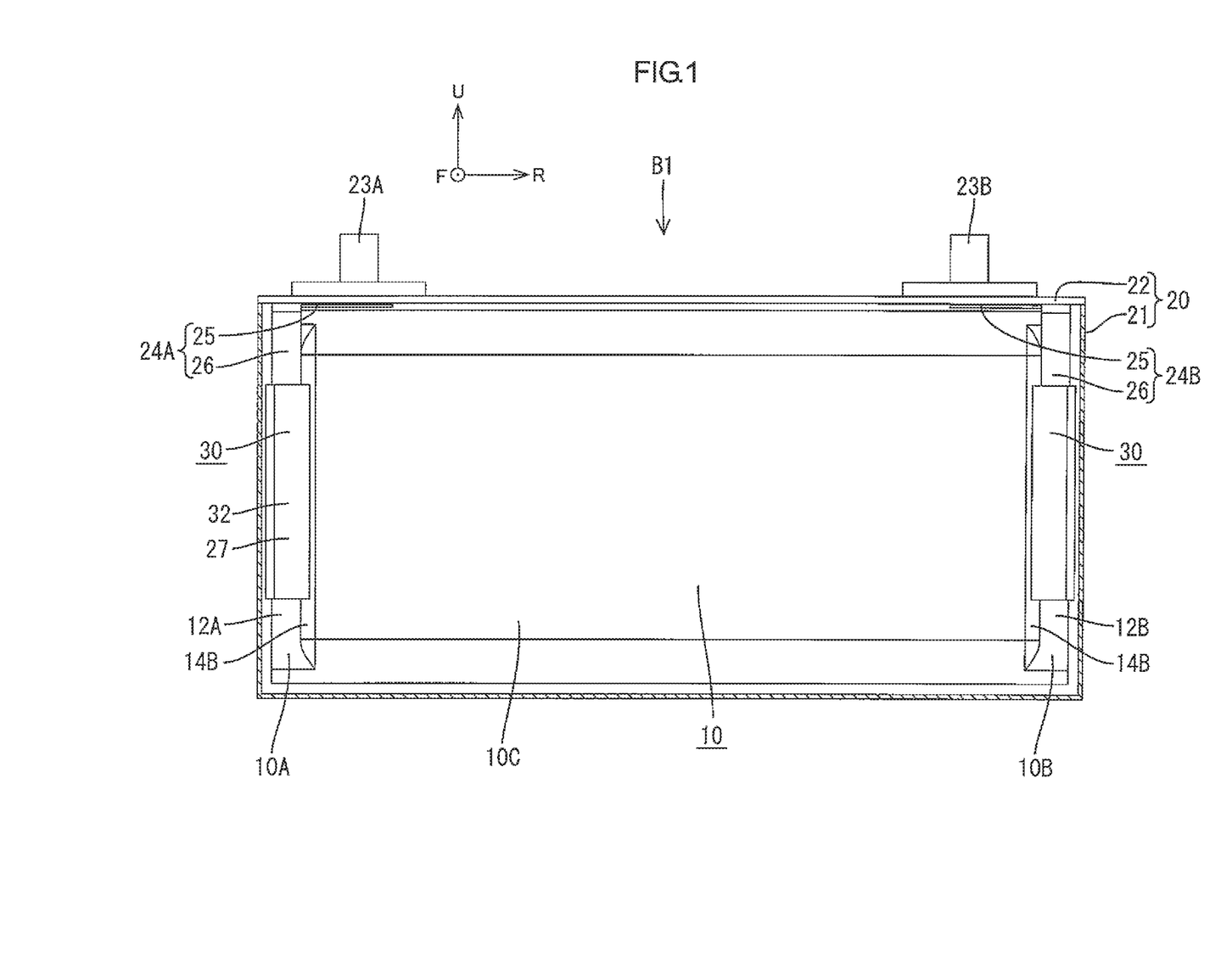
FIG. 1 is a front cross-sectional view of a cell illustrating an arrangement inside an outer package according to a first embodiment.
Figure 2:
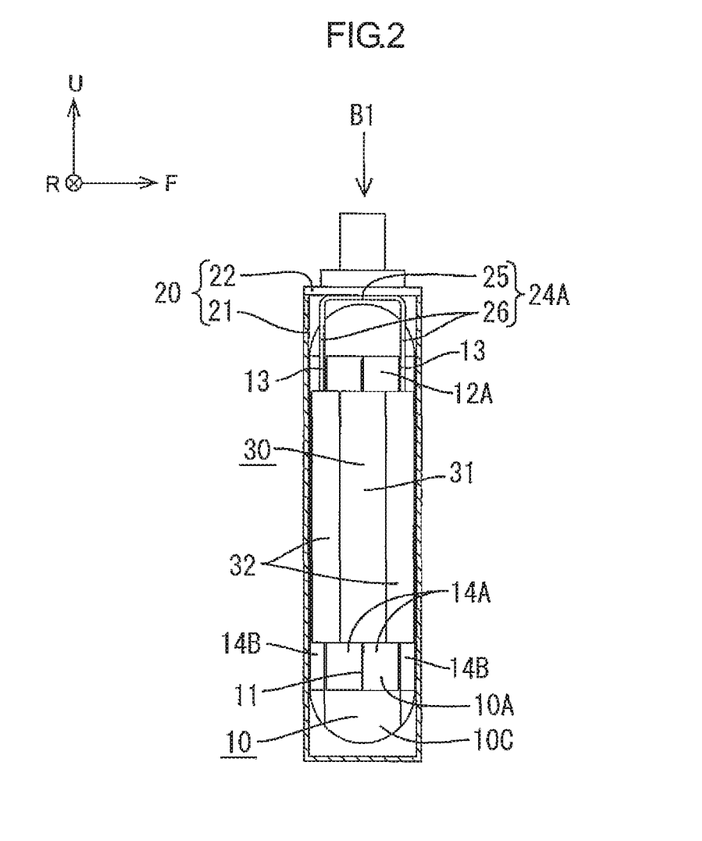
FIG. 2 is a side cross-sectional view of the cell illustrating the arrangement inside the outer package.

As illustrated in FIG. 1, the outer package 20 includes a container 21 and a lid 22. The top of the container 21 is open. The lid 22 covers the top of the container 21. The positive terminal 23A and the negative terminal 23B penetrate through the lid 22 and project upward. The positive terminal 23A and the negative terminal 23B are provided for power input and output.

Figure 4:
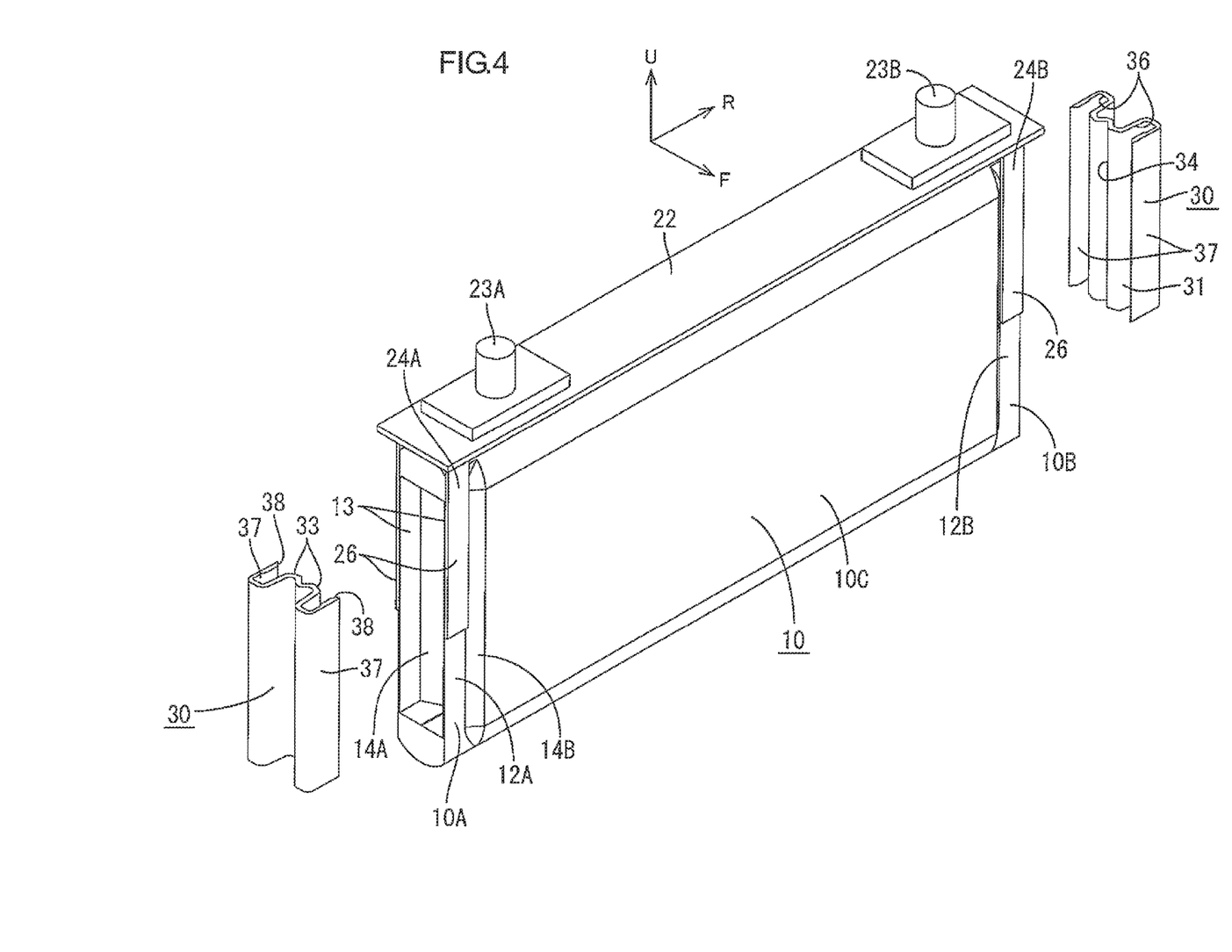
FIG. 4 is a perspective view illustrating a power generating element and spacers that are separated from the power generating element.

The positive current collector 24A is connected to the positive terminal 23A and the positive terminal portion 10A (see FIG. 4). The negative current collector 24B is connected to the negative terminal 23B and the negative terminal portion 10B (see FIG. 4). Each of the positive current collector 24A and the negative current collector 24B is a metal plate having a sufficient thickness to provide a large ampacity. Specifically, the positive current collector 24A is an aluminum alloy plate and the negative current collector 24B is a copper alloy plate.

As illustrated in FIG. 1, each of the positive current collector 24A and the negative current collector 24B includes a main portion 25 and a pair of leg portions 26. The main portion 25 is connected to the positive terminal 23A or the negative terminal 23B. The leg portions 26 are connected to the positive terminal portion 10A and the negative terminal portion 10B of the power generating element 10, respectively. The main portion 25 is arranged along an inner surface of the lid 22. The leg portions 26 are arranged along the respective surfaces of the positive terminal portion 10A and the negative terminal portion 10B, respectively.

Each leg portion 26 having an elongated shape extends from the corresponding edge of the main portion 25 in a direction perpendicular to the bottom surface of the main portion 25 (see FIG. 4). The leg portions 26 of each of the positive current collector 24A and the negative current collector 24B face each other. The leg portions 26 are arranged in front of or behind the respective attachment portions 13 such that the attachment portions 13 are located between the leg portions 26. The leg portions 26 are held to the respective attachment portions 13 with clips (not illustrated) and welded by ultrasonic welding or any other method.

Spacers 30 (movement restricting members) are arranged close to the positive terminal portion 10A and the negative terminal portion 10B, respectively. Specifically, each spacer 30 is arranged between the side of the main portion 10C and the inner surface of the outer package 20 opposite the side of the main portion 10C. Each spacer 30 restricts movements of the main portion 10C relative to the positive current collector 24A or the negative current collector 24B.

Figure 3:
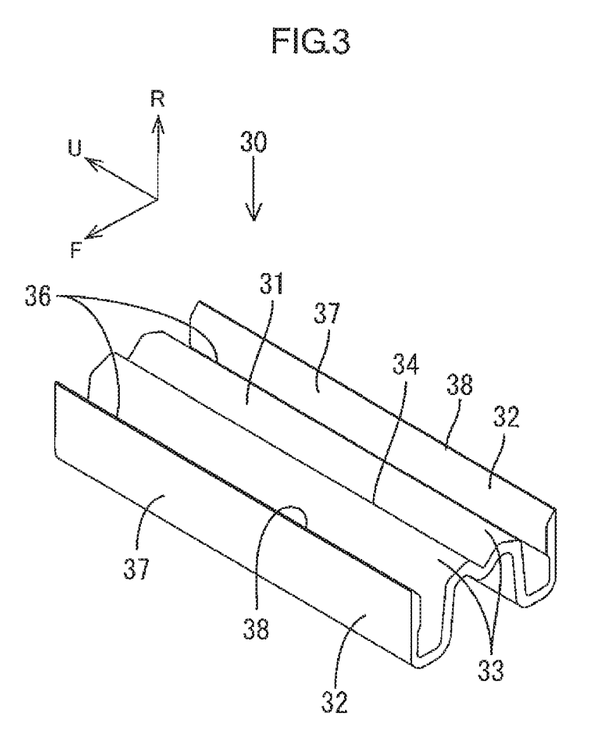
FIG. 3 is a perspective view of a spacer.

Each spacer 30 is prepared by forming a thin synthetic resin plate into a winding shape as illustrated in FIG. 3. The spacer 30 has a constant thickness and thus a warp is less likely to occur during injection molding. The width of the spacer 30 measuring in the font-rear direction is substantially equal to the thickness of the main portion 10C. The length of the spacer 30 measuring in the vertical direction is larger than the length of the leg portion 26 of the positive current collector 24A or the negative current collector 24B. The spacers 30 are attached to the positive terminal portion 10A and the negative terminal portion 10B, respectively, so as to cover almost entire areas of the positive terminal portion 10A and the negative terminal portion 10B (see FIG. 5).

Each spacer 30 includes a first holding portion 31 with a considerable width measuring in the right-left direction and second holding portions 37. The first holding portion 31 is inserted between the leg portions 26. The second holding portions 37 are arranged outer than the leg portions 26.

The first holding portion 31 is a recessed portion having an M-shaped cross section along a recess in the positive terminal portion 10A or the negative terminal portion 10B. The recess is defined by a pair of the attachment portions 13 and the inner sloped surfaces 14A. The depth of the first holding portion 31 is substantially equal to the depth of the recess.

The first holding portion 31 includes first sloped holding surfaces 33 along (or facing) the inner sloped surfaces 14A. The inner sloped surfaces 14A incline in opposite directions from the core 11 and the first sloped holding surfaces 33 are sloped along the respective inner sloped surfaces 14A. An outer edge of each first sloped holding surface 33 closer to the corresponding leg portion 26 and an inner edge thereof closer to the core 11 are rounded, that is, not pointed toward the main portion 10C (see FIG. 6).

The first holding portion 31 further includes an escape part 34 for the core 11. The escape part 34 is located at about the center of the spacer 30 with respect to the front-rear direction, that is, between the first holding surfaces 33. The escape part 34 has a round V-shape horizontal cross section. Namely, the escape part 34 is recessed outward from the core 11 side such that a peak thereof is away from the side of the power generating element 10.

Each second holding portion 37 includes a second holding surface 38 at an inner edge (at the rightmost edge in FIG. 6). The second holding surface 38 is sloped along (or facing) the outer sloped surface 14B. The second holding surface 38 has round edges 38A and 38B (see FIG. 6). Specifically, the outer edge 38A is not pointed toward the main portion 10C and continues to the outer surface of the second holding portion 37. The inner edge 38B is more gently curved than the outer edge 38A and continues to the inner surface of the second holding portion 37.

The second holding portion 37 has different thicknesses, which measure in the direction along the side of the main portion 10C, in different parts. The thickness of a distal end part of the second holding portion 37 closer to the power generating element 10 is larger than the thickness of the base end part away from the main portion 10C. The base end part is closer to a base at which the second holding portion 37 is connected to the other portion of the spacer 30. An inner surface of the base end part of the second holding portion 37 facing the leg portion 26 is located outer than an inner surface of the distal end part facing the leg portion 26.

Each of the first holding portion 31 and the second holding portion 37 has a height measuring in the right-left direction larger than the width of the leg portion 26. Specifically, each of the first holding portion 31 and the second holding portion 37 and the leg portion 26 of corresponding one of the first holding portion 31 and the second holding portion 37 are arranged in a direction perpendicular to a direction in which the side of the main portion 10C and the inner surface of the outer package 20 are opposed. Each of the first holding portion 31 and the second holding portion 37 has a dimension measuring in the direction in which the side of the main portion 10C and the inner surface of the outer package 20 are opposed. Each leg portion 26 of each of the current collectors 24A and 24B also has a dimension measuring in the direction in which the side of the main portion 10C and the inner surface of the outer package 20 are opposed. The dimension of each of the first holding portion 31 and the second holding portion 37 is larger than the dimension of the leg portion 26.

The first holding portion 31 and the second holding portion 37 project closer to the main portion 10C than the leg portion 26. The width of each of the first holding portion 31 and the second holding portion 37 measuring in the front-rear direction is defined such that the first holding surface 33 and the second holding surface 38 are located as follows. The first holding surface 33 and the second holding surface 38 are located predetermined distances away from the inner sloped surface 14A and the outer sloped surface 14B, respectively. With this configuration, space is provided between the first holding surface 33 and the inner sloped surface 14A. Furthermore, space is provided between the second holding surface 38 and the outer sloped surface 14B. Therefore, the spacer 30 is less likely to hit the main portion 10C and thus the positive current collector foils 12A or the negative current collector foils 12B are less likely to be damaged.

Each spacer 30 includes an insulating portion 32 for insulating the current collector 24A or 24B from the outer package 20. The insulating portion 32 is arranged between the leg portion 26 and the inner surface of the outer package 20 with respect to the right-left direction. The insulating portion 32 is in contact with the outer side of the leg portion 26. The insulating portion 32 is shaped so as to cover the outer side of the leg portion 26. The insulating portion 32 continues to the first holding portion 31 and the second holding portion 37. The insulating portion 32, a part of the first holding portion 31, and the second holding portion 37 form U-like shape in cross section around the leg portion 26. The U-like shape in cross section opens toward the main portion 10C. The insulating portion 32, the part of the first holding portion 31, and the second holding portion 37 define a container space 36 in which the leg portion 26 is contained. A part of the second holding portion 37 also functions as an insulator. The part of the second holding portion 37 and the insulating portion 32 are referred to as an insulating section of the spacer 30.

Figure 5:
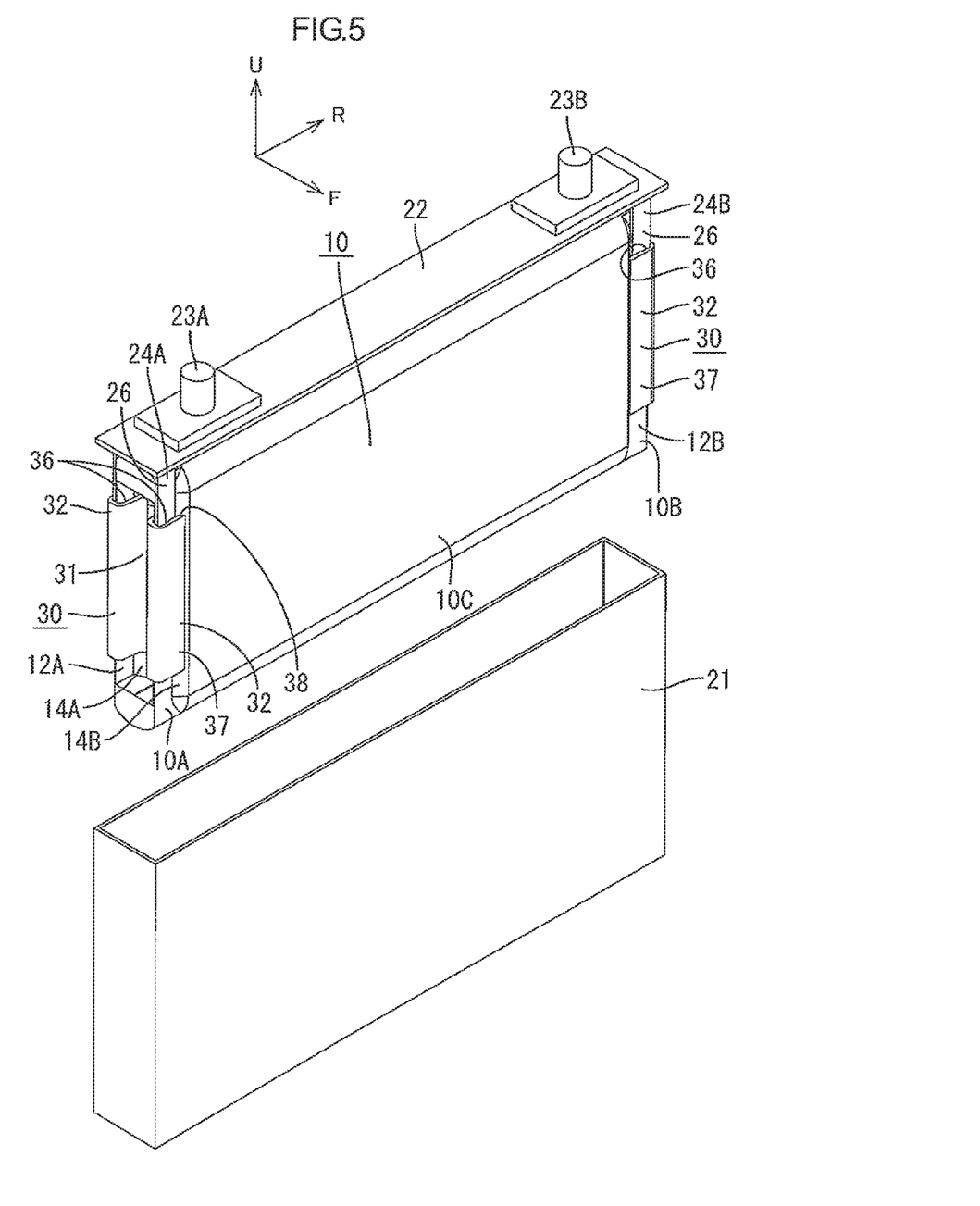
FIG. 5 is a perspective view illustrating the outer package, the power generating element that is out of the outer package, and the spacers that are attached to the power generating element.

As illustrated in FIG. 5, the spacers 30 are attached to the respective sides of the main portion 10C and then inserted in the outer package 20. When the spacers 30 are inserted in the outer package 20 together with the power generating element 10, the spacers 30 are predetermined distances away from the container 21 as illustrated in FIG. 6. The insulating sections are arranged opposite the respective corners of the container 21.

According to the above configuration, the following effects can be achieved. When the power generating element 10 of the cell B1 moves relative to the first holding portions 31 and the second holding portions 37, the power generating element 10 is in contact with the first holding portions 31 and the second holding portions 37. As a result, the relative movements of the main portion 10C to the current collectors 24A and 24B in the arrangement direction thereof are restricted by the first holding portions 31 and the second holding portions 37.

If the cell B1 is subjected to strong vibrations or a high impact, the main portion 10C having a relatively heavy weight may move inside the outer package 20. If the power main portion 10C moves, the power main portion 10C may be in contact with the first holding portions 31 and the second holding portions 37. When the spacers 30 are pushed by the power main portion 10C, the spacers 30 may be in contact with the container 20. The first holding portions 31 and the second holding portion 37 support the power main portion 10C to restrict the movements of the power main portion 10C toward the leg portions 26.

Even if the cell B1 is subjected to strong vibrations or a high impact, the current collectors 24A and 24B are less likely to stick into the power main portion 10C. Furthermore, the current collectors 24A and 24B are less likely to deform and thus cracks are less likely to be formed in the currant collectors 24A and 24B. Namely, high levels of vibration resistance and impact resistance are provided.

The first holding surface 33 and the second holding surface 38 are sloped along the respective sloped side surfaces of the power main portion 10C. Therefore, the first holding portion 31 and the second holding portion 37 are in surface contact with the respective side surfaces of the power main portion 10C. With this configuration, the spacers 30 are further less likely to stick into the power main portion 10C.

In comparison to metal spacers, the spacers 30 made of synthetic resin are lighter in weight and more flexible. With the flexibility of the spacers 30, vibrations and impacts are absorbed and thus higher levels of vibration resistance and impact resistance are provided.

The current collectors 24A and 24B are properly insulated from the outer package 20 by the insulating sections of the spacers 30 arranged between the outer package 20 and the respective current collectors 24A and 24B.

Because the first holding portion 31 of each spacer 30 is arranged between the leg portions 26 of the corresponding current collector 24A or 24B, the leg portions 26 are less likely to slant inward or outward even if the cell B1 is subjected to strong vibrations or a high impact.

Furthermore, the core 11 of the power generating element 10 is less likely to hit the spacers 30 because each spacer 30 has the escape part 34.

Because the thickness of the distal end part of each second holding portion 37 is larger than that of the base end part thereof, the second holding portions 37 are less likely to stick into the main portion 10C.

The first holding portions 31 and the second holding portions 37 are held away from the side surfaces of the main portion 10C. Therefore, the spacers 30 are less likely to be in contact with the main portion 10C and thus the main portion 10C is less likely to be damaged.

Because the edges of the first holding surfaces 38A and second holding surfaces 38B are rounded, the spacers 30 are further less likely to stick into the main portion 10C.

<Second Embodiment>

A second embodiment will be described with reference to FIGS. 7 to 9. Spacers having different configurations from those in the first embodiment will be described. Other configurations of a cell B2 according to this embodiment are the same as the first embodiment. The same components as the first embodiment will be indicated by the same symbols and will not be explained. In the drawings, orientations of the components of the cell B2 are indicated by arrows U, F, and R pointing to the upper side, the front side, and the right side of the cell B2.

The cell B2 includes a pair of side spacers 50 (movement restricting members) and a bottom spacer 60. The left side spacer and the right side spacer of the side spacers 50 are indicated by 50A and 50B, respectively. The left side spacer 50A and the right side spacer 50B are attached to the positive terminal portion 10A and the negative terminal portion 10B of the power generating element 10, respectively. Each side spacer 50A or 50B is made of synthetic resin and prepared by forming a thin plate by bending or extrusion processing. The left side spacer 50A and the right side spacer 50B have the same configuration. The configuration will be described with reference to the right side spacer 50B.

Figure 7:
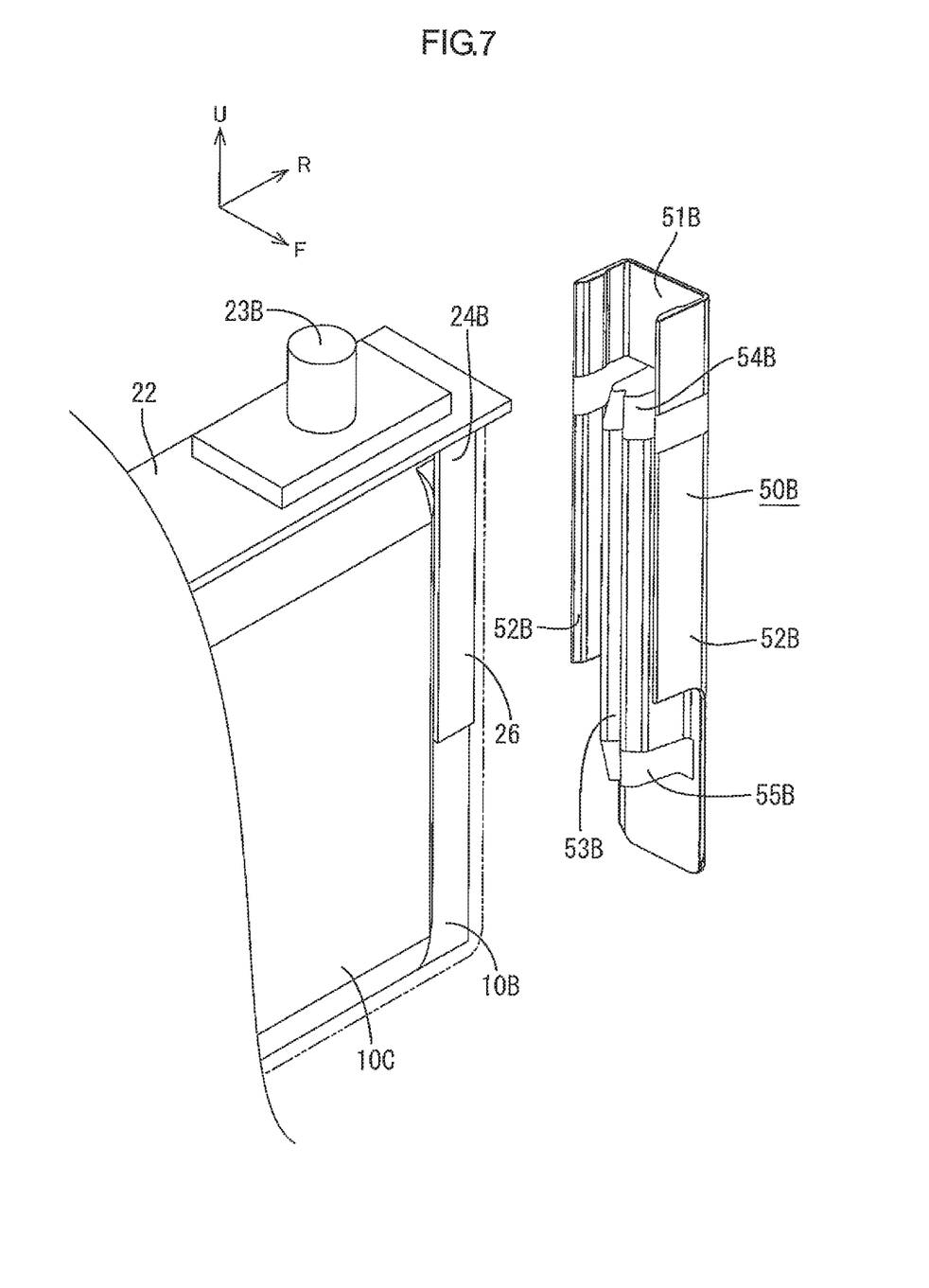
FIG. 7 is a perspective view illustrating a power generating element and a spacer separated from the power generating element according to a second embodiment.

As illustrated in FIG. 7, the side spacer 50B includes a base portion 51B and a pair of holding portions 52B. The base portion 51B has a plate-like overall shape extending in the vertical direction. The length of the base portion 51B measuring in the vertical direction is substantially equal to the height of an inner wall of the container 21.

With this configuration, the side spacer 50B is less likely to move in the vertical direction and thus less likely to rattle. The side spacer 50B further includes a protrusion 53B projecting from the base portion 51B to the left in FIG. 7. The protrusion 53B has a horizontal cross sectional shape similar to the horizontal cross sectional shape of a combination of the first holding portions 31 and the escape part 34 of the spacer 30 illustrated in FIG. 6.

An upper end part 54B of the protrusion 53B is tapered toward the right in front view, that is, a height of the upper end part 54B decreases toward the distal end. A lower end part 55B of the protrusion 53B is also tapered toward the right in front view, that is, a height of the lower end part 55B decreases toward the distal end. With this configuration, the side spacer 50B is less likely to damage the main portion 10C in comparison to those having square end parts. The middle part of the side spacer 50B between the upper end part 54B and the lower end part 55B includes ridges with constant height and a valley with a constant depth. The protrusion 53B is arranged in an area corresponding to the middle parts of the negative terminal portions 10B with respect to the vertical direction.

The holding portions 52B project from the base portion 51B to the left in FIG. 7. The horizontal cross sectional shape of each holding portion 52B is similar to the horizontal cross sectional shape of the second holding portion 37 of each spacer 30 illustrated in FIG. 6. The upper end part of the holding portion 52B extends to the upper end of the base portion 51B and the lower end part thereof extends to a predetermined distance above the lower end of the base portion 51B.

Figure 8:
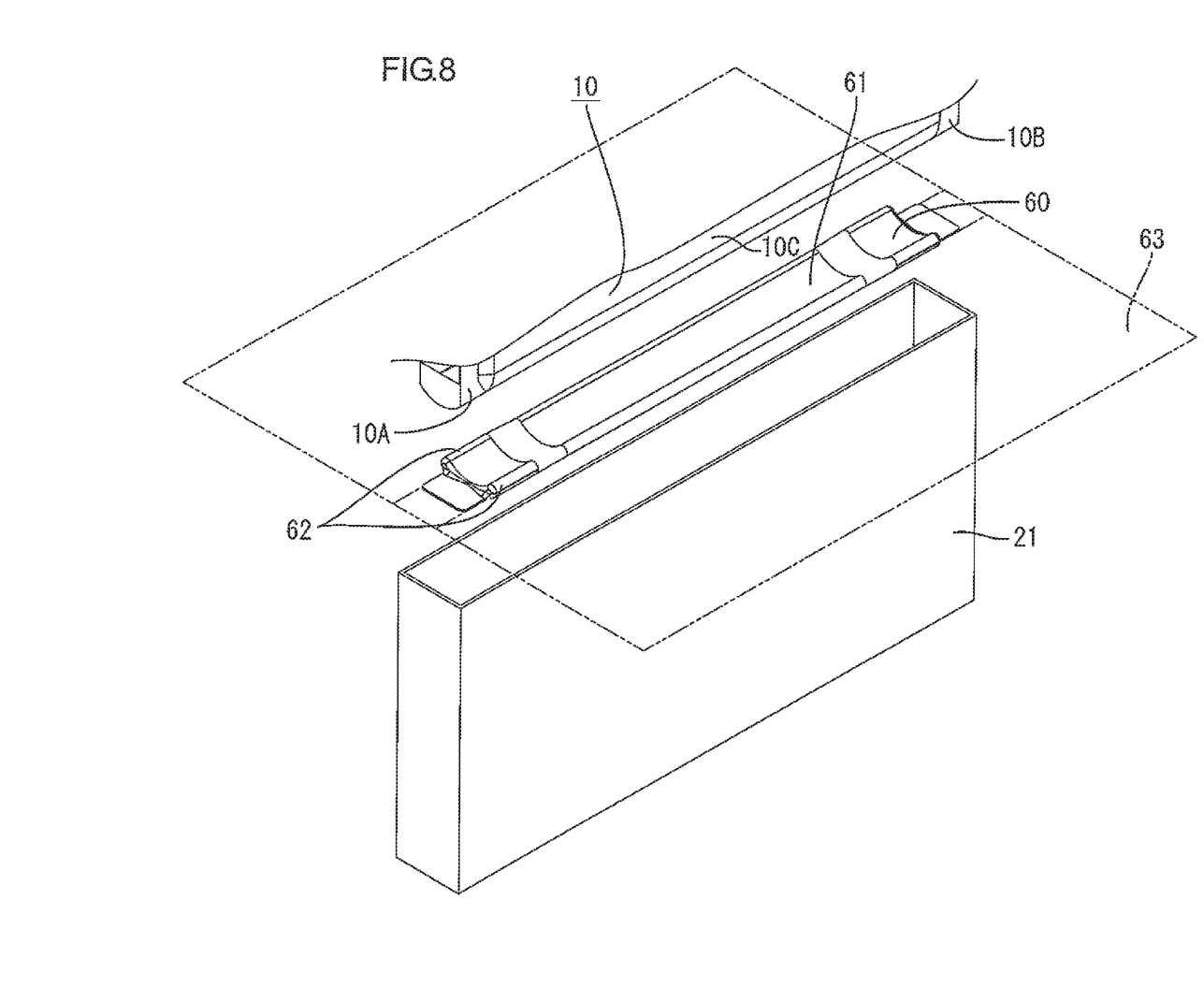
FIG. 8 is a perspective view illustrating a bottom spacer positioned outside an outer package.
Figure 9:
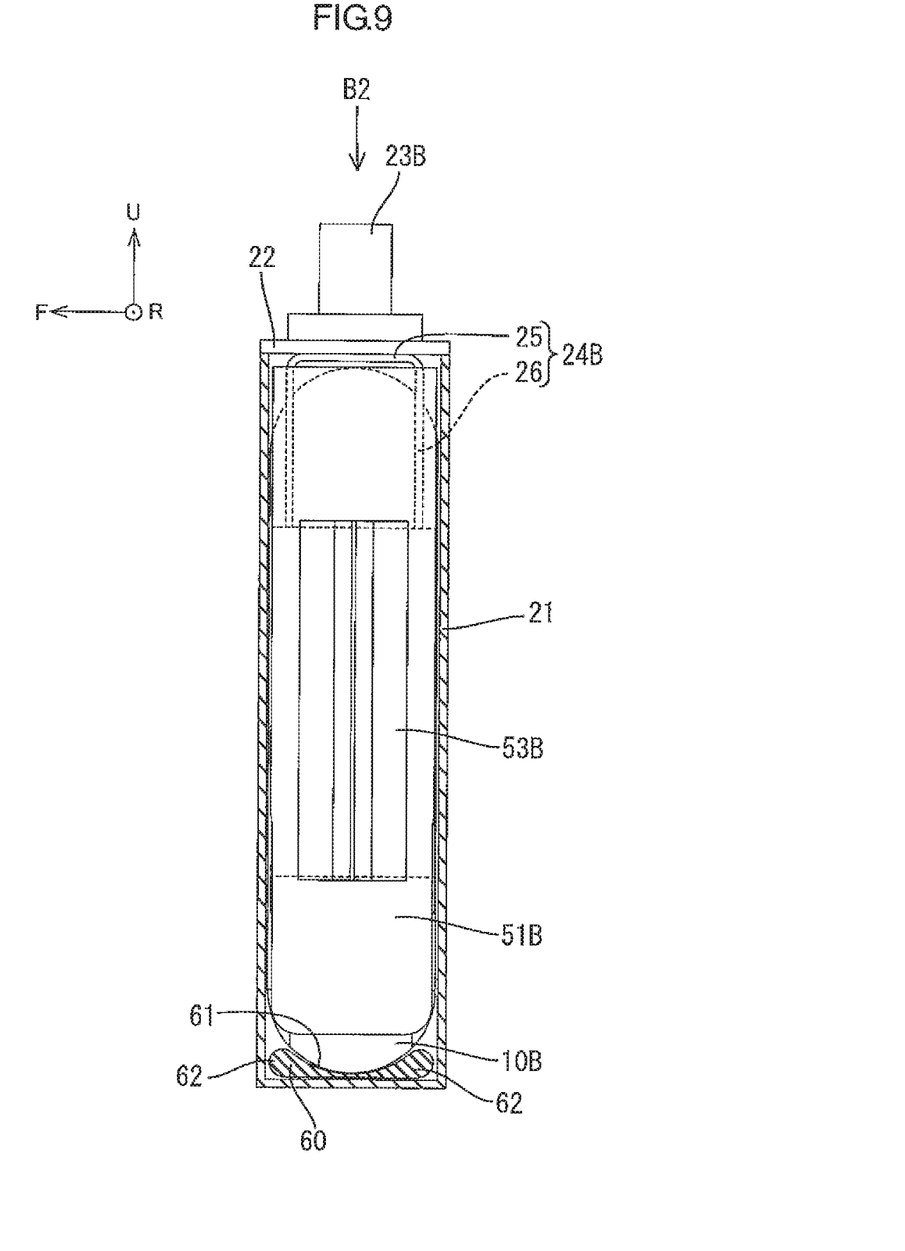
FIG. 9 is a side cross-sectional view of a cell.

As illustrated in FIG. 8, the bottom spacer 60 is arranged below the main portion 10C inside the container 21. Specifically, the bottom spacer 60 is arranged on the inner bottom surface of the outer package 20. The bottom spacer 60 is provided for protecting the main portion 10C from a collision with the bottom surface of the container 21. The bottom spacer 60 is made of synthetic resin and in an elongated plate-like shape that extends in the right-left direction. The bottom spacer 60 has a groove 61 curved along the bottom surface of the main portion 10C. As illustrated in FIG. 9, the groove 61 is formed such that the vertical cross section of the bottom spacer 60 has an arc-like edge. The groove 61 extends for an entire length of the bottom spacer 60.

The bottom spacer 60 has a larger thickness in front and rear edge parts 62 than in the center part. With this configuration, the bottom spacer 60 is less likely to bend. As illustrated in FIG. 8, the bottom spacer 60 is arranged on an insulating sheet 63 on the bottom surface of the container 21. The insulating sheet 63 arranged inside the container 21 covers the front and the rear inner surfaces of the container 21.

<Third Embodiment>

A third embodiment will be explained with reference to FIG. 10. Spacers having different configurations from those in the second embodiment will be described. Other configurations of a cell B3 according to this embodiment are the same as the second embodiment. The same components as the second embodiment will be indicated by the same symbols and will not be explained. In the drawings, orientations of the components of the cell B3 are indicated by arrows U, F, and R pointing to the upper side, the front side, and the right side of the cell B3.

The cell B3 includes a pair of side spacers 70 (movement restricting members). The left side spacer and the right side spacer of the side spacers 70 are indicated by 70A and 70B, respectively. The left side spacer 70A and the right side spacer 70B are attached to the positive terminal portion 10A and the negative terminal portion 10B of the power generating element 10, respectively. Each side spacer 70A or 70B is made of synthetic resin and prepared by forming a thin plate by bending or extrusion processing. The left side spacer 70A and the right side spacer 70B have the same configuration. The configuration will be described with reference to the right side spacer 70B.

Figure 10:
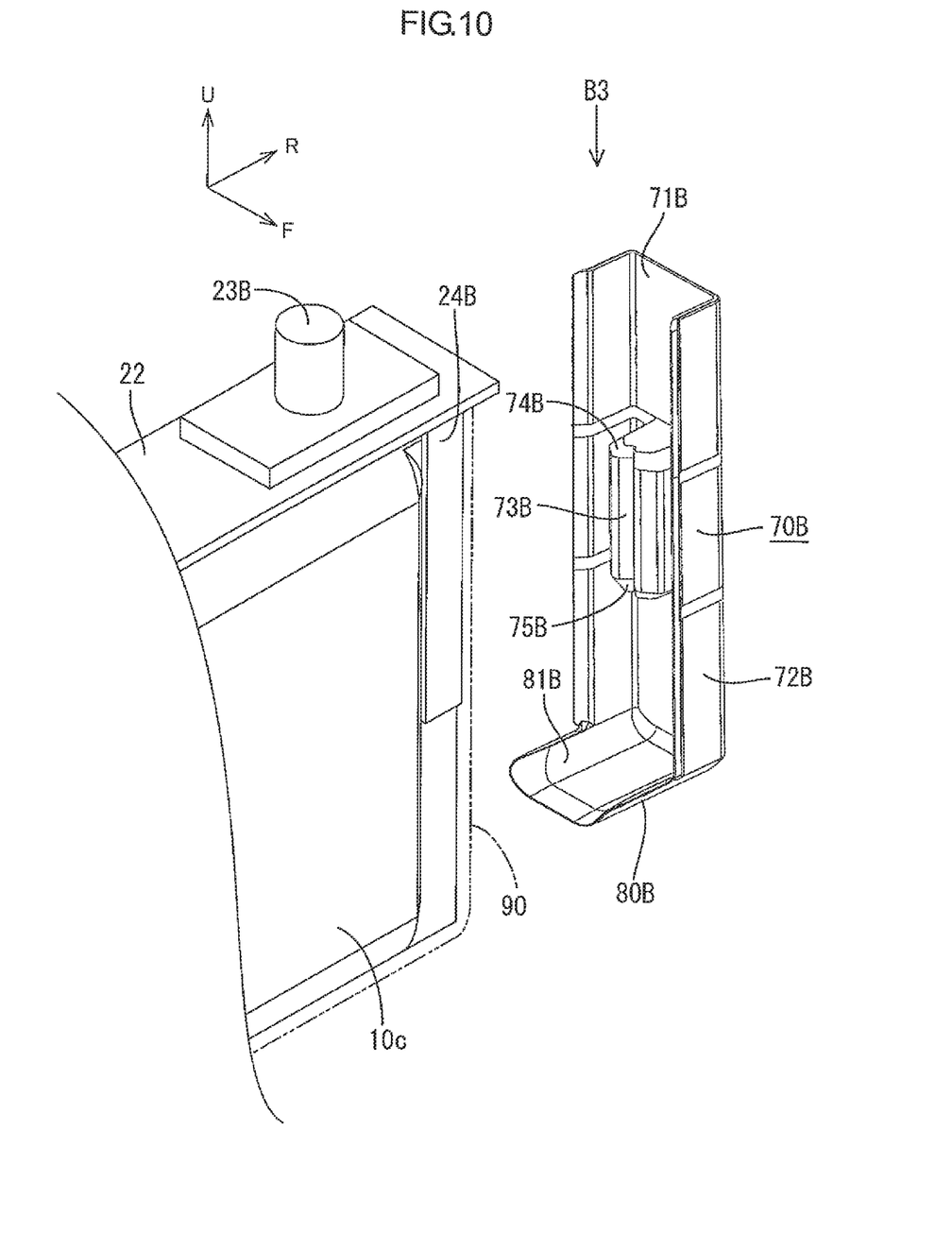
FIG. 10 is a perspective view illustrating a power generating element and a spacer separated from the power generating element according to a third embodiment.

As illustrated in FIG. 10, the side spacer 70B includes a base portion 71B, a pair of holding portions 72B, and a bottom portion 80B (a receiving portion). The base portion 71B has a plate-like overall shape that extends in the vertical direction. The length of the base portion 71B measuring in the vertical direction is substantially equal to the height of the inner wall of the container 21. With this configuration, the side spacer 70B is less likely to move in the vertical direction and thus less likely to rattle.

The side spacer 70B further includes a protrusion 73B projecting from the base portion 71B to the left in FIG. 10. The protrusion 73B has a horizontal cross sectional shape similar to the horizontal cross sectional shape of a combination of the first holding portions 31 and the escape part 34 of the spacer 30 illustrated in FIG. 6. The protrusion 73B is formed in the middle part of the base portion 71B with respect to the vertical direction. The length of the protrusion 73B measuring in the vertical direction is smaller than that of the protrusion 53B of the side spacer 50B in the second embodiment.

An upper end part 74B of the protrusion 73B is tapered toward the right in front view, that is, a height of the upper end part 54B decreases toward the distal end. A lower end part 75B of the protrusion 73B is also tapered toward the right in front view, that is, a height of the lower end part 75B decreases toward the distal end. With this configuration, the side spacer 70B is less likely to damage the main portion 10C in comparison to those having square end parts.

The holding portions 72B project from the front and the rear edge of the base portion 71B, respectively, toward the left in FIG. 10. Each holding portion 72B has a horizontal cross section similar to that of the second holding portion 37 of the spacer 30 illustrated in FIG. 6. The holding portion 72B extends from the upper end of the base portion 71B to the lower end of the base portion 71B.

The bottom portion 80B projects from the lower edge of the base portion 71B toward the right in FIG. 10. The bottom portion 80 has a groove 81B in the upper surface. The groove 81B is curved along the bottom surface of the main portion 10C. Specifically, the groove 81B is formed such that the vertical cross section of the bottom portion 80B has an arc-like edge. The bottom surface of the right corner of the main portion 10C with an insulating sheet 90 wrapped therearound in advance is placed on the bottom portion 80B. With this configuration, a separate bottom spacer such as the bottom spacer 60 in the second embodiment is not required for protecting the main portion 10C from a collision with the bottom surface of the container 21.

<Other Embodiments>

The present invention is not limited to the embodiments described above with reference to the description and drawings; for example, the following various embodiments will also be included in the technical scope of the invention.

(1) The electrochemical device may be a lithium ion capacitor that causes electrochemical phenomenon instead of the non-aqueous electrolyte secondary battery.

(2) The power generating element 10 may have a drum-like shape or any other shape rather than the flattened shape with the positive electrode and the negative electrode layered on the respective side of the separator and wound. The positive electrode and the negative electrode may not be wound but only layered.

(3) The power generating element 10 may include two or more cells. In this case, spacers may be attached to each cell or a single spacer may be attached to sides of multiple cells.

(4) The spacers 30, 50 or 70 may be arranged without space between the spacers 30, 50 or 70 and the container 21.

(5) The spacers 30, 50 or 70 may have projections that in line contact with the main portion 10C instead of the surfaces sloped along the sloped side surfaces of the main portion 10C. The holding surfaces may be provided in areas with which the main portion 10C may be strongly in contact for restricting the movements of the main portion 10C. The first holding surfaces 33 and the second holding surfaces 38 may not be parallel to the side surfaces of the main portion 10C. The holding surfaces may be in surface contact with the side surfaces of the main portion 10C as long as the holding surfaces are opposite the side surfaces if vibrations occur.

(6) The first holding surfaces and the second holding surfaces may be softly in contact with the main portion 10C as long as the first holding surfaces and the second holding surfaces do not damage the positive current collector foil or the negative current collector foil.

(7) The first holding portion of each spacer may be formed in a block-like shape, instead of the winding shape, so as to be fitted in the recess in the side surface of the main portion 10C.

(8) Each spacer may includes locks that elastically lock the leg portions for restricting the movements of the main portion 10C. If the spacers are pushed by the main portion 10C, the spacers are locked to the main portion 10C. As a result, the first holding portions and the second holding portions support the main portion 10C so as to restrict the movements of the main portion 10C.

(9) The width of the first holding portions 31 and the second holding portions 37 may be smaller than the width of the leg portions as long as the first holding portions 31 and the second holding portions 37 restricts large movements of the main portion 10C to reduce short circuit.

(10) The first holding portions and the second holding portions may be separately provided. Alternatively, each spacer may be divided at the point at which the escape part is provided. Namely, each spacer may include a single first holding portion and a single second holding portion. Each spacer may include any one of the first holding portion and the second holding portion.

(11) The first holding portions 31 and the second holding portion 37 may not project more to the main portion 10C than the current collectors 24A and 24B. With this configuration, the current collectors 24A and 24B are still less likely to stick into the main portion 10C in comparison to the known configuration without such holding portions.

What is claimed is:

1. An electrochemical device, comprising:
a power generating element including a main portion and a terminal portion, the terminal portion being provided on a side of the main portion, the terminal portion including layers of metal foils;

an outer package including a container and a lid, the
container including a side wall and a bottom wall and
housing the power generating element, the lid being
formed with a terminal;
a current collector including a leg portion to which the
layers of metal foils are attached; and
a movement restricting member being arranged between
the terminal portion of the power generating element
and an inner surface of the side wall opposite the
terminal portion, the movement restricting member
including a holding portion which projects closer to the
main portion than the leg portion,
wherein, in a cross-sectional view cut along a line perpendicular to the side wall, the power generating element is movable relative to the holding portion, and
wherein the holding portion is electrically insulative.

2. The electrochemical device according to claim 1, wherein the holding portion includes a distal end part and a base part, the distal end part having a thickness larger than a thickness of the base part.

3. The electrochemical device according claim 1, wherein the leg portion of the current collector includes a pair of the leg portions, and
wherein the holding portion is arranged between the pair of the leg portions.

4. The electrochemical device according to claim 1, wherein the holding portions comprises a first member and a second member that extends from the first member with an angle of more than 90°.

5. The electrochemical device according to claim 1, wherein the holding portion is not in contact with the side of the main portion of the power generating element.

6. The electrochemical device according to claim 1, wherein the moving restriction portion is electrically insulative.

7. An electrochemical device, comprising;
a power generating element including a main portion and
a terminal portion, the main portion including an electrode prepared by forming an active material layer on
a metal foil surface, the terminal portion being provided on a side of the main portion, the terminal portion
including layers of metal foils;
an outer package including a container and a lid, the
container including a side wall and a bottom wall and
housing the power generating element, the lid being
formed with a terminal;
a current collector including a leg portion to which the
layers of metal foils are attached; and
a movement restricting member being arranged between
the terminal portion of the power generating element
and an inner surface of the side wall opposite the
terminal portion, the movement restricting member
including a holding portion,
wherein, in a cross-sectional view cut along a line perpendicular to the side wall, the side wall, the movement
restricting member, and the leg portion are arranged in
this order, and the holding portion projects closer to the
main portion than the leg portion,
wherein, in the cross-sectional view cut along the line
perpendicular to the side wail, inner surfaces of tips of
the holding portion are arranged away from the side of
the main portion of the power generating element,
wherein the movement restricting member is electrically
insulative, and
wherein the holding portion is electrically insulative.

8. The electrochemical device according to claim 1, wherein the holding portion and the current collector are arranged in a direction perpendicular to a direction in which the side of the main portion and the inner surface of the side wall are opposed,
wherein the holding portion and the current collector have dimensions measuring in a direction in which the side of the main portion and the inner surface of the side wall are opposed, and
wherein the dimension of the holding portion is larger than the dimension of the current collector.

9. The electrochemical device according to claim 1, wherein the holding portion is arranged away from the current collector.

10. The electrochemical device according to claim 1, wherein the holding portion includes a holding surface that directly faces the side of the main portion.

11. The electrochemical device according to claim 1, wherein the holding portion includes a holding surface facing the side of the main portion of the power generating element, the holding surface having a round edge.

12. The electrochemical device according to claim 1, wherein the movement restricting member is in contact with an inner bottom surface of the outer package.

13. The electrochemical device according to claim 1, wherein the movement restricting member includes a receiving portion at a lower end thereof, a bottom surface of the main portion of the power generating element being placed on the receiving portion.

14. The electrochemical device according to claim 1, wherein the leg portion of the current collector includes a pair of leg portions, and
wherein the holding portion includes a first holding portion arranged between the pair of the leg portions.

15. The electrochemical device according to claim 14, wherein the first holding portion comprises a first member and a second member that extends from the first member with the angle of more than 90°.

16. The electrochemical device according to claim 1, wherein a dimension of the movement restricting member measuring in a direction perpendicular to the lid is smaller than that of the power generating element.

17. The electromechanical device according to claim 14, wherein the terminal portion includes a plurality of terminal portions,
wherein the current collector further includes a main portion being connected to the terminal, the leg portions being connected to the respective terminal portions, and
wherein the holding portion further includes second holding portions, the second holding portions being arranged outwardly of respective leg portions.

18. The electrochemical device according to claim 17, wherein the movement restricting member comprises a resin.

19. The electrochemical device according to claim 17, wherein the holding portion includes a holding surface facing the side of the main portion of the power generating element, the holding surface having a round edge.

20. The electrochemical device according to claim 17, wherein the movement restricting member is in contact with an inner bottom surface of the outer package.

21. The electrochemical device according to claim 17, wherein the movement restricting member includes a receiving portion at a lower end thereof, a bottom surface of the main portion of the power generating element being placed on the receiving portion.

* * * * *